Patented Aug. 23, 1927.

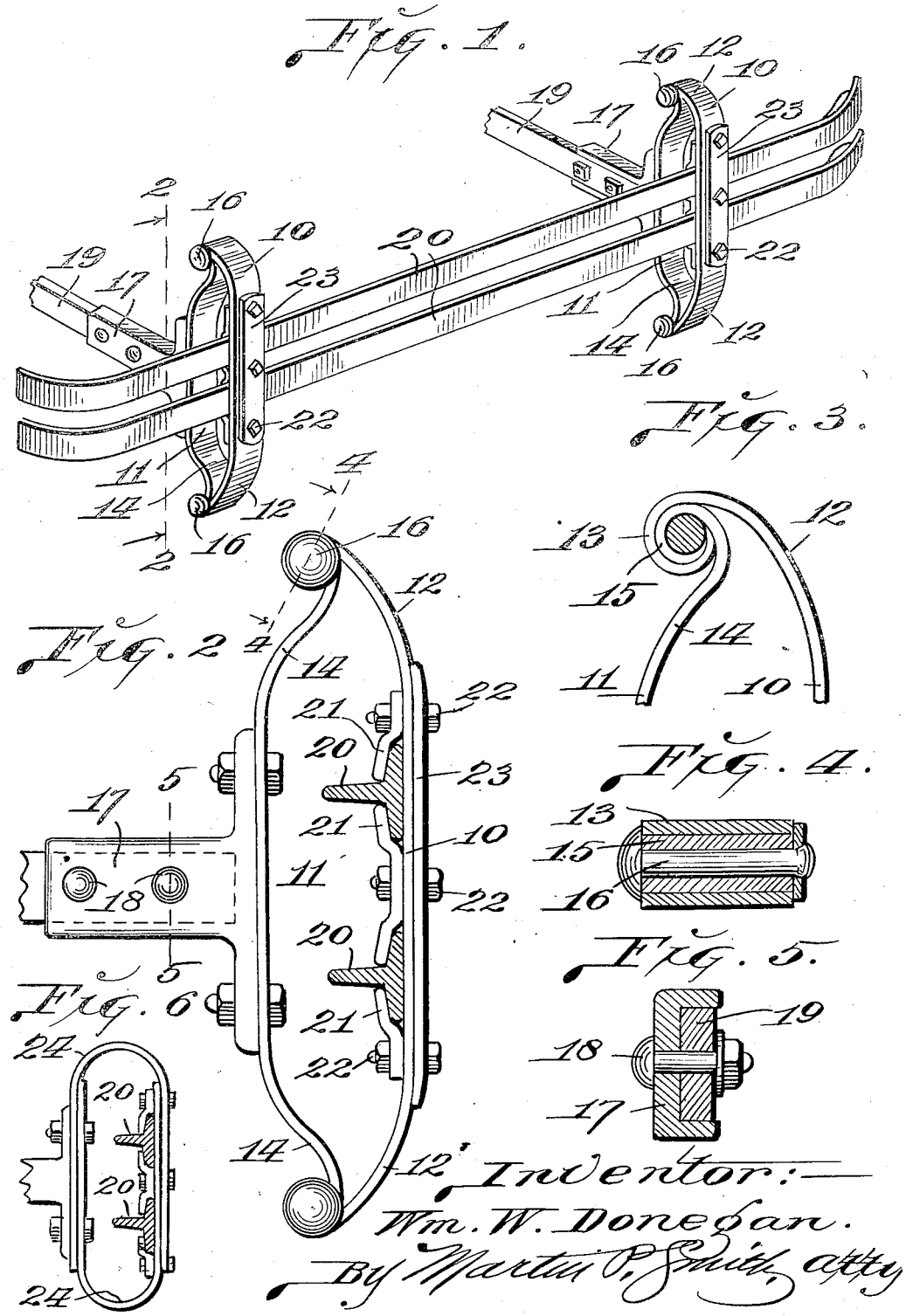

1,640,145

UNITED STATES PATENT OFFICE.

WILLIAM W. DONEGAN, OF LOS ANGELES, CALIFORNIA.

AUTOMOBILE BUMPER AND SUPPORT.

Application filed September 16, 1926. Serial No. 135,768.

My invention relates to an automobile bumper and has for its principal objects to generally improve upon and simplify the construction of the existing forms of automobile bumpers; to provide a bumper that includes one or more bumper bars that are carried by short vertically disposed mountings or frames that are preferably constructed of resilient material, said mountings being directly connected to the supporting means that extends forwardly or rearwardly from the frame of the motor vehicle, which vertically disposed frames or mountings are effective in materially increasing the factors of safety and protection afforded by the bumper; and further, to provide a bumper of the character referred to that is inexpensive of manufacture and which, while comparatively light in weight, is of strong and substantial structure and capable of being readily applied to an automobile frame.

With the foregoing and other objects in view, my invention consists in certain novel features of construction and arrangement of parts that will hereinafter be more fully described and claimed and illustrated in the accompanying drawing, in which—

Fig. 1 is a perspective view of a bumper of my improved construction.

Fig. 2 is an enlarged vertical section taken on the line 2—2 of Fig. 1.

Fig. 3 is an elevational view of the upper portion of one of the upright frames or mountings and showing the bolt that connects the parts of said mountings in section.

Fig. 4 is a cross section taken on the line 4—4 of Fig. 2.

Fig. 5 is an enlarged cross section taken on the line 5—5 of Fig. 2.

Fig. 6 is an elevational view of a modified form of the resilient mounting that carries the bumper bars and which is connected to the bumper support.

In the construction of my improved bumper, I make use of a pair of vertically disposed frames or mountings, each of which includes a front member 10 and a rear member 11. These members are preferably formed of flat bearings of spring steel and the intermediate portions of said members are spaced apart a distance of from three to six inches, depending on the size of the bumper and the make of car to which it is to be applied.

The terminal portions of the front member 10 are curved rearwardly as designated by 12 and the ends of said terminal portions are bent into circular loops 13. The terminal portions of rear member 11 are bent forwardly to form compound curved portions 14 and the ends of these portions are formed into loops 15 that fit snugly within the loops 13. After the looped ends 15 of rear member 11 are positioned in the looped ends 13 of front member 12, the inter-engaging portions are firmly secured to each other by bolts 16, the shanks of which pass through the loops 15 (see Fig. 4).

Secured in any suitable manner to the intermediate portion of rear member 11 is a bracket 17, preferably of cast metal, and which bracket is detachably secured, preferably by means of bolts 18, to bumper supporting arms or bars 19 that are rigidly fixed to the frame of the automobile, preferably the side members thereof. In the construction of the brackets 17 I prefer to recess the portions thereof that receive the bars 19 as illustrated in Fig. 5.

The members 10 of the resilient frames or mountings form supports and points of attachment for the horizontally disposed bumper bar or bars 20, which latter may be flat bars of spring steel or rolled bars of T or channel shape in cross section. Obviously there may be one, two, or three of these bumper bars, the number thereof depending on the size of the bumper and make of car to which it is applied, although for the average automobile I have found that two bumper bars are sufficient.

The bumper bars 20 are arranged with their flat front faces bearing directly against the inner or rear faces of the intermediate portions of front members 10 and to firmly clamp and secure the bars to said members 10, I employ metal clips or plates 21 that are secured to the members 10 by means of bolts such as 22 and portions of which clips or plates overlie the flanges of the bars 20. Positioned on the front face of the intermediate portion of each member 10 is a reinforcing plate 23 through which pass the bolts 22 that secure the clips or plate 21 to the frames or mountings and this front plate 23 not only acts as a reinforcement but it may be nickel-plated or painted a distinctive color, thereby producing a pleasing ornamental effect.

Inasmuch as the members 10 and 11 of the frames or mountings that connect the bumper bars to the automobile frame are formed of resilient material such as spring steel and the end portions of said members are curved toward and connected to each other, they will yield to a considerable extent under strains and stresses and therefore said frames or mountings will act to absorb the forces of shocks that may be impressed on the front members of the mountings or upon any portions of the bumper bars with the result that the liability of serious damage as a result of collisions is minimized. Inasmuch as the upright frames or mountings of my improved bumper extend substantial distances above and below the bumper bars, the bumper will not tend to ride over or under an obstruction such as a bumper on an adjacent car, and thus an additional safeguard and protection is provided and the latter being especially effective when automobiles are positioned or parked immediately adjacent to each other as is the case in parking stations, public garages, and the like.

In the modified construction illustrated in Fig. 6, the resilient frame or mounting is formed by two substantially U-shaped members 24 that are formed of flat bars of spring steel and the straight leg portions of which members overlie each other and when connected serve as the vertical members of the mounting. One of these vertical members is connected by bolts or the like to the supporting bracket while the other vertical member provides a support for the bumper bars.

Thus it will be seen that I have provided an improved automobile bumper that includes a pair of upright resilient frames of mountings that are effective in absorbing the shocks of collisions and which bumper possesses superior advantages in point of simplicity, durability, and general efficiency.

It will be understood that minor changes in the size, form and construction of the various parts of my improved bumper may be made and substituted for those herein shown and described without departing from the spirit of my invention, the scope of which is set forth in the appended claims.

I claim as my invention:

1. In an automobile bumper, a pair of vertically disposed substantially oval loops formed of resilient material, a horizontally disposed flanged bumper bar positioned against the inner faces of the front portions of said vertically disposed resilient loops and clips secured to the inner faces of the front members of said vertically disposed, resilient loops and engaging the flanges of said bumper bar.

2. In an automobile bumper, a pair of vertically disposed substantially oval loops formed of resilient material, a horizontally disposed flanged bumper bar positioned against the inner faces of the front portions of said vertically disposed resilient loops, clips secured to the inner faces of the front members of said vertically disposed resilient loops and engaging the flanges of said bumper bar and supporting brackets secured to and projecting rearwardly from the rear members of said vertically disposed resilient loops.

3. In an automobile bumper, a pair of upright frames, each composed of a pair of spaced bars of resilient material, the terminal portions of which are curved toward and connected to each other, a bracket secured to and projecting rearwardly from the rear one of each pair of bars and a horizontally disposed bumper bar positioned against the inner faces of the front members of said upright frames and secured thereto.

4. In an automobile bumper, a pair of spaced frames, each composed of a pair of vertically disposed bars of resilient material, the ends of which are curved toward and secured to each other, attaching brackets connected to and projecting rearwardly from the rear bars of the two frames, a horizontally disposed bumper bar positioned against the inner faces of the front members of the two frames and clips for securing the bumper bar to the front members of said frames.

5. In an automobile bumper, a pair of spaced frames, each composed of a pair of vertically disposed bars of resilient material, the ends of which are curved toward and secured to each other, attaching brackets connected to and projecting rearwardly from the rear bars of the two frames, a horizontally disposed bumper bar positioned against the inner faces of the front members of the two frames, clips for securing the bumper bar to the front members of said frames and reinforcing plates positioned on the intermediate portions of the front faces of the front member of the two upright frames.

6. In an automobile bumper, a bumper bar supporting member comprising a pair of vertically disposed resilient bars, the intermediate portions of which are spaced apart, the terminal portions of which bars are curved toward and connected to each other, bumper bar engaging clips arranged on the inner face of the front member of each supporting frame and a reinforcing bar arranged on the front face of the front member of said supporting frame.

7. In an automobile bumper, a bumper bar supporting member comprising a pair of vertically disposed resilient bars, the intermediate portions of which are spaced apart, the terminal portions of which bars are curved toward and connected to each other, bumper bar engaging clips arranged on the inner face of the front member of each supporting frame, a reinforcing bar arranged on the front face of the front member of said supporting frame and means for securing said reinforcing plate and clips to the front member of the upright frame.

8. In an automobile bumper, a pair of vertically disposed substantially oval loops formed of resilient metal, a horizontally disposed flanged bumper bar positioned against the inner faces of the front members of said vertically disposed loops, clips arranged against the inner faces of the front portions of said loops and engaging the flanges of said bumper bar, reinforcing plates arranged on the front faces of the front members of the loops and fastening means passing through said reinforcing plates and clips.

9. In an automobile bumper, a pair of vertically disposed substantially oval loops formed of resilient metal, a horizontally disposed flanged bumper bar positioned against the inner faces of the front members of said vertically disposed loops, clips arranged against the inner faces of the front portions of said loops and engaging the flanges of said bumper bar, reinforcing plates arranged on the front faces of the front members of the loops, fastening means passing through said reinforcing plates and clips and supporting brackets secured to and projecting rearwardly from the rear members of said vertically disposed loops.

In testimony whereof I affix my signature.

WILLIAM W. DONEGAN.